US010298352B2

(12) United States Patent
Wang et al.

(10) Patent No.: US 10,298,352 B2
(45) Date of Patent: May 21, 2019

(54) RADIO SINGLE SYMBOL DESIGN VIA FREQUENCY DIVISION MULTIPLEXING OF REFERENCE SIGNALS AND DATA TONES

(71) Applicant: QUALCOMM Incorporated, San Diego, CA (US)

(72) Inventors: Renqiu Wang, San Diego, CA (US); Seyong Park, San Diego, CA (US); Yi Huang, San Diego, CA (US); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/969,245

(22) Filed: May 2, 2018

(65) Prior Publication Data
US 2018/0323892 A1 Nov. 8, 2018

Related U.S. Application Data

(60) Provisional application No. 62/501,689, filed on May 4, 2017.

(51) Int. Cl.
H04J 11/00 (2006.01)
H04L 27/26 (2006.01)
(Continued)

(52) U.S. Cl.
CPC .......... H04J 11/00 (2013.01); H04L 27/2604 (2013.01); H04L 27/2613 (2013.01);
(Continued)

(58) Field of Classification Search
CPC ...... H04J 11/00; H04L 5/0046; H04L 5/0055; H04L 27/2604; H04L 27/2613; H04L 27/2637
See application file for complete search history.

(56) References Cited

U.S. PATENT DOCUMENTS

2013/0343334 A1* 12/2013 Papasakellariou .......................... H04W 72/0413
370/329

OTHER PUBLICATIONS

Intel Corporation: "Link Level Evaluation and Comparison of Sequence vs. DM-RS Based Structures for Short UL Control Channel," 3GPP Draft; R1-1700367, 3rd Generation Partnership Project (3GPP), Mobile Competence Centre; 650, Route Des Lucioles; F-06921 Sophia-Antipolis Cedex; France, vol. RAN WG1, no. Spokane, USA; Jan. 16, 2017-Jan. 20, 2017, Jan. 16, 2017, XP051207904, 6 pages, Retrieved from the Internet: URL: http://www.3gpp.org/ftp/Meetings_3GPP_SYNC/RAN1/Docs/ [retrieved on Jan. 16, 2017].

(Continued)

Primary Examiner — Kabir A Timory
(74) Attorney, Agent, or Firm — Linda G. Gunderson; Loza & Loza

(57) ABSTRACT

Aspects of the disclosure relate to a new radio (NR) single symbol design in which reference signals and data tones are frequency division multiplexed (FDM). In a particular aspect of the disclosure, a different encoding sequence is assigned to each possible value of an information element (IE) such that a minimum distance between encoding sequences corresponding to any pair of possible values is maximized. A symbol corresponding to a particular value of the IE is then transmitted. Here, the symbol is configured according to a sequence selected from a set of sequences corresponding to the particular value of the IE, such that the symbol comprises a plurality of reference signals FDM with a plurality of FDM resource elements.

30 Claims, 10 Drawing Sheets

(51) Int. Cl.
*H04L 5/00* (2006.01)
*H04L 1/00* (2006.01)

(52) U.S. Cl.
CPC ... *H04L 27/2637* (2013.01); *H04J 2011/0009* (2013.01); *H04L 1/00* (2013.01); *H04L 5/001* (2013.01); *H04L 5/0046* (2013.01); *H04L 5/0051* (2013.01); *H04L 5/0055* (2013.01); *H04L 27/2607* (2013.01); *H04L 27/2615* (2013.01)

(56) References Cited

OTHER PUBLICATIONS

Intel Corporation: "Short PUCCH Formats for 1~2 UCI Bits," 3GPP Draft; R1-1704750, Short PUCCH Formats for 1 or 2 UCI Bits, 3rd Generation Partnership Project (3GPP), Mobile Competence Centre; 650, Route Des Lucioles; F-06921 Sophia-Antipolis Cedex; France, vol. RAN WG1, no. Spokane, USA; Apr. 3, 2017-Apr. 7, 2017, Apr. 2, 2017, XP051242888, 3 pages, Retrieved from the Internet: URL: http://www.3gpp.org/ftp/Meetings_3GPP_SYNC/RAN1/Docs/ [retrieved on Apr. 2, 2017].

International Search Report and Written Opinion—PCT/US2018/030982—ISA/EPO—dated Aug. 6, 2018.

LG Electronics: "Design of Short NR-PUCCH Format," 3GPP Draft; R1-1704907, 3rd Generation Partnership Project (3GPP), Mobile Competence Centre; 650, Route Des Lucioles; F-06921 Sophia-Antipolis Cedex; France, vol. RAN WG1, no. Spokane, USA; Apr. 3, 2017-Apr. 7, 2017, Apr. 2, 2017, XP051243042, 9 pages, Retrieved from the Internet: URL; http://www.3gpp.org/ftp/Meetings_3GPP_SYNC/RAN1/Docs/ [retrieved on Apr. 2, 2017].

Nokia, et al., "On the Short PUCCH for Small UCI Payloads," 3GPP Draft; R1-1705233_SHORTPUCCH_SMALLPAYLOAD_FINAL, 3rd Generation Partnership Project (3GPP), Mobile Competence Centre; 650, Route Des Lucioles; F-06921, Sophia-Antipolis Cedex; France, vol. RAN WG1, no. Spokane, WA, USA; Apr. 3, 2017-Apr. 7, 2017, Apr. 2, 2017, XP051243364, 6 pages, Retrieved from the Internet: URL: Http://www.3gpp.org/ftp/Meetings_3GPP_SYNC/RAN1/Docs/ [retrieved on Apr. 2, 2017].

\* cited by examiner

RADIO SINGLE SYMBOL DESIGN VIA FREQUENCY DIVISION MULTIPLEXING OF REFERENCE SIGNALS AND DATA TONES

CROSS-REFERENCE TO RELATED APPLICATIONS

The application claims priority to and the benefit of U.S. provisional patent application No. 62/501,689 filed on May 4, 2017, the entire content of which is incorporated herein by reference as if fully set forth below in its entirety and for all applicable purposes.

TECHNICAL FIELD

The technology discussed below relates generally to wireless communication systems, and more particularly, to a new radio (NR) single symbol design based on a frequency division multiplexing of reference signals and data tones.

INTRODUCTION

As the demand for mobile broadband access continues to increase, research and development continue to advance wireless communication technologies not only to meet the growing demand for mobile broadband access, but to advance and enhance the user experience with mobile communications. New radio access technologies, such as 5G new radio (NR) access technology, promise to make wireless broadband indistinguishable from wireline with fiber-like performance at a significantly lower cost-per-bit. For 5G NR networks, it is anticipated that orthogonal frequency division multiplexing (OFDM) may be utilized for downlink (DL) transmissions, uplink (UL) transmissions, and/or sidelink transmissions. For UL transmissions in particular, it should be noted that a transmitting device (e.g., a scheduled entity such as a user equipment (UE)) may utilize one or more resource elements (REs) within a resource block (RB) to carry UL control information including one or more UL control channels, such as a physical uplink control channel (PUCCH), to a scheduling entity (e.g., an eNodeB).

As will be discussed in more detail below, UL control information and/or data may be transmitted via UL short bursts. For instance, acknowledgment (ACK) bits may be transmitted via UL short bursts of one or two symbols. For single symbol designs of larger payloads (e.g., an ACK represented by three or more bits), it is anticipated that an OFDM-based design is used in which reference signals (e.g., a demodulation reference signal (DMRS)) are frequency division multiplexed with data tones of a particular information element (e.g., an ACK represented by three or more bits). For smaller payloads (e.g., an ACK represented by one or two bits), however, a particular single symbol design is unclear. Accordingly, it would be desirable to provide an OFDM-based single symbol design for such smaller payloads that is both reliable and efficient.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In the examples below, disclosed aspects relate to a new radio (NR) single symbol design based on a frequency division multiplexing of reference signals and data tones. In one example, a method is disclosed, which includes assigning a different encoding sequence to each possible value of an information element (IE) such that a minimum distance between encoding sequences corresponding to any pair of possible values is maximized. The method then concludes with transmitting a symbol corresponding to a particular value of the IE. Here, the symbol is configured according to a sequence selected from a set of sequences corresponding to the particular value of the IE, such that the symbol comprises a plurality of reference signals frequency division multiplexed (FDM) with a plurality of FDM resource elements.

In a second example, a wireless communication device is disclosed, which includes a processor communicatively coupled to a memory, a transceiver, an assignment circuitry, and a symbol transmission circuitry. For this example, the assignment circuitry is configured to assign a different encoding sequence to each possible value of an IE such that a minimum distance between encoding sequences corresponding to any pair of possible values is maximized. The symbol transmission circuitry is then configured to transmit a symbol corresponding to a particular value of the IE. Here, the symbol is configured according to a sequence selected from a set of sequences corresponding to the particular value of the IE, such that the symbol comprises a plurality of reference signals FDM with a plurality of FDM resource elements.

In a third example, an apparatus for wireless communication is disclosed. The apparatus includes means for assigning a different encoding sequence to each possible value of an IE such that a minimum distance between encoding sequences corresponding to any pair of possible values is maximized. The apparatus further includes means for transmitting a symbol corresponding to a particular value of the IE. Here, the symbol is configured according to a sequence selected from a set of sequences corresponding to the particular value of the IE, such that the symbol comprises a plurality of reference signals FDM with a plurality of FDM resource elements.

In a fourth example, a non-transitory computer-readable medium storing computer-executable code, comprising code for causing a computer to perform various acts is disclosed. For this example, such code includes code for causing the processor to assign a different encoding sequence to each possible value of an IE such that a minimum distance between encoding sequences corresponding to any pair of possible values is maximized. The code may also include code for causing the processor to transmit a symbol corresponding to a particular value of the IE. Here, the symbol is configured according to a sequence selected from a set of sequences corresponding to the particular value of the IE, such that the symbol comprises a plurality of reference signals FDM with a plurality of FDM resource elements.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
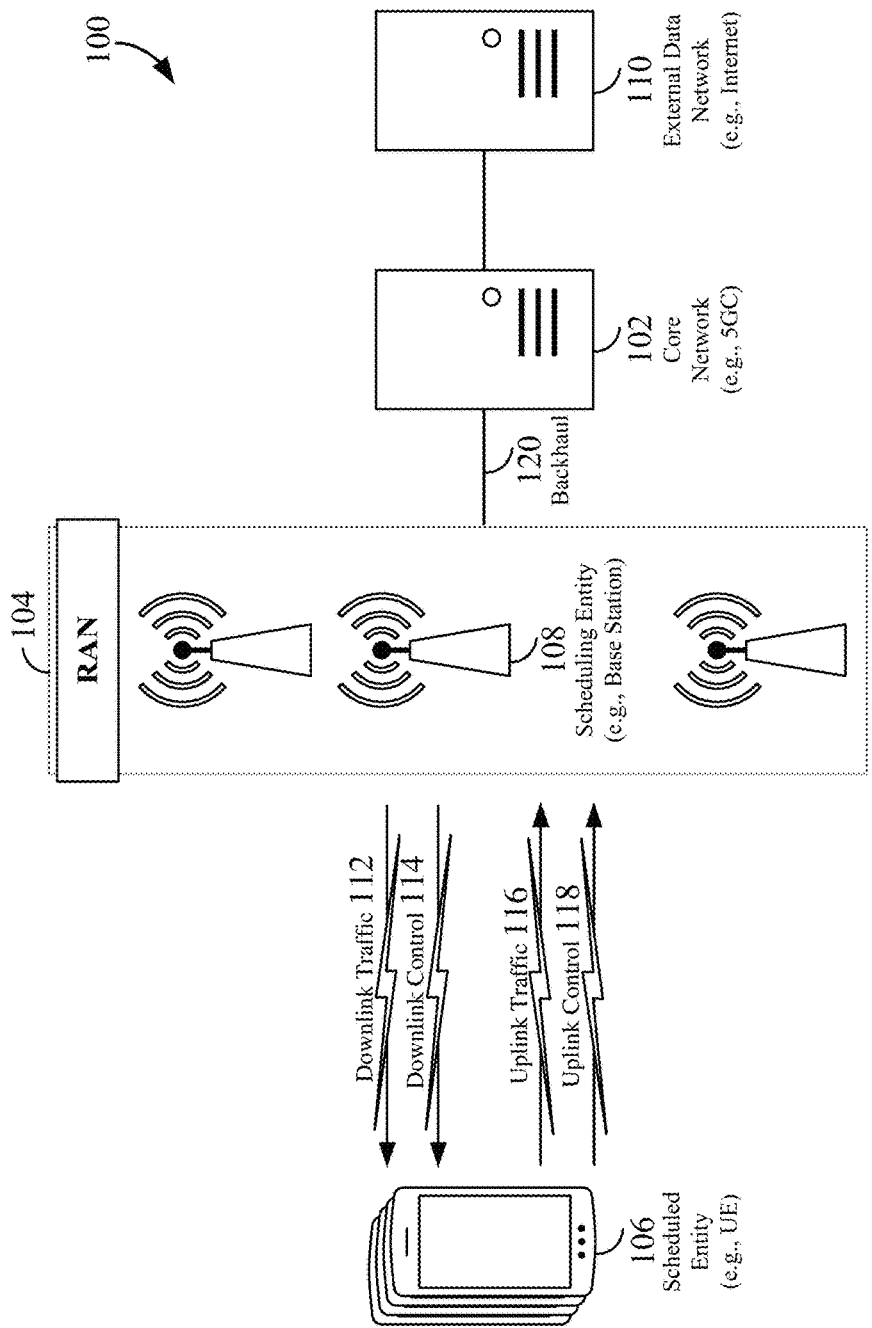
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As will discussed in more detail herein, the present disclosure includes aspects directed towards an orthogonal frequency division multiplexing (OFDM)-based single symbol design for uplink (UL) short burst transmissions. In particular, an OFDM-based single symbol design is contemplated for transmitting small payloads (e.g., an ACK represented by one or two bits) via UL short burst transmissions. In one aspect, reliability is optimized by selecting an encoding sequence for such transmissions from a plurality of encoding sequences in which a minimum distance (i.e., minimum difference) between any pair of encoding sequences among the plurality of encoding sequences is maximized. In another aspect of the disclosure, performance is further optimized by selecting a particular set of encoding sequences based on a peak-to-average power ratio (PAPR) associated with that set. Once an encoding sequence is selected, the desired payload is transmitted within a single symbol comprising a plurality of frequency division multiplexed (FDM) resource elements configured according to the selected encoding sequence.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

OFDM: orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

CP: cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

RS: reference signal. A predefined signal known a priori to both transmitters and receivers and transmitted through the wireless channel, and used for, among other things, for channel estimation of the wireless channel.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
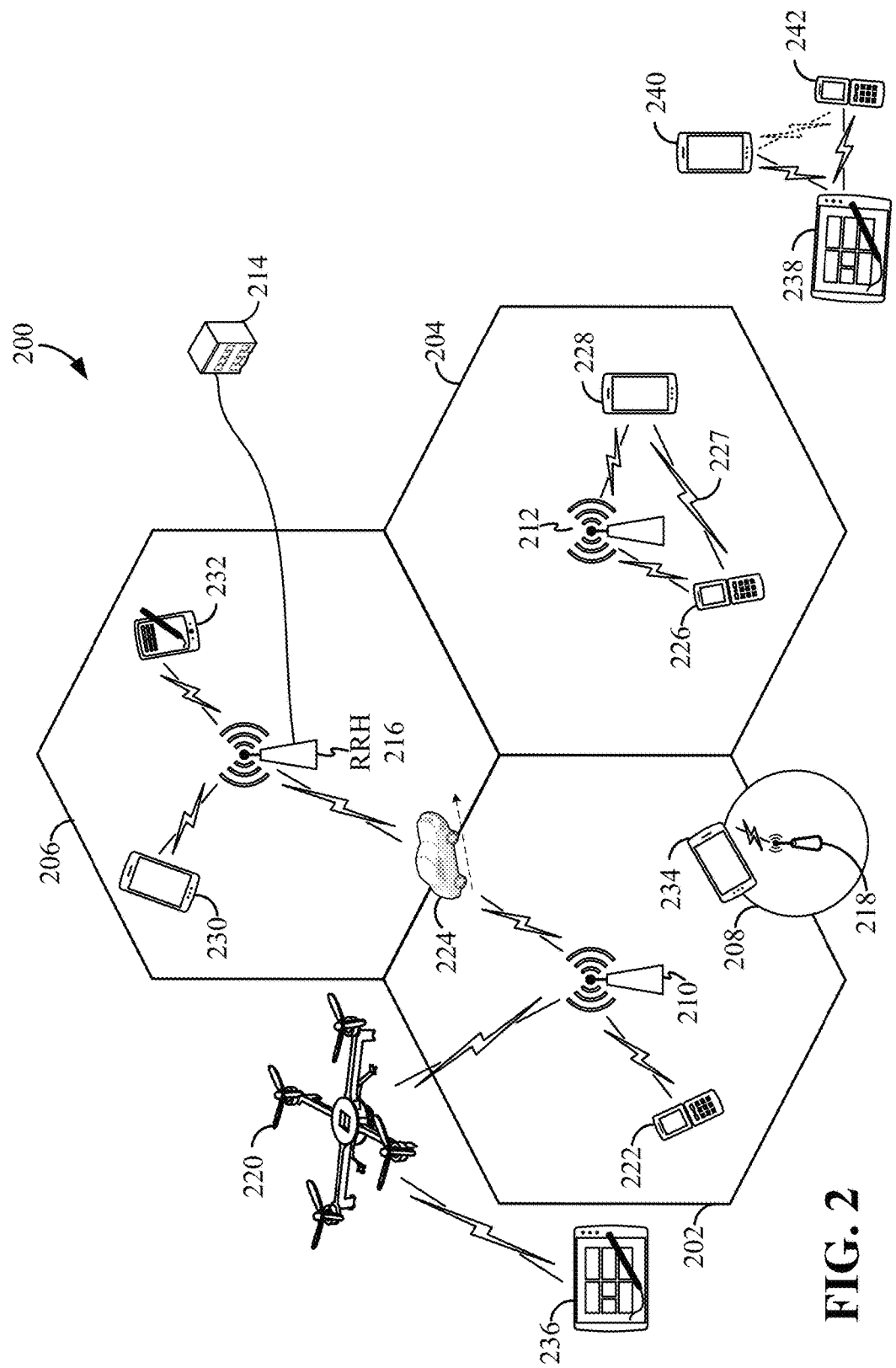
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
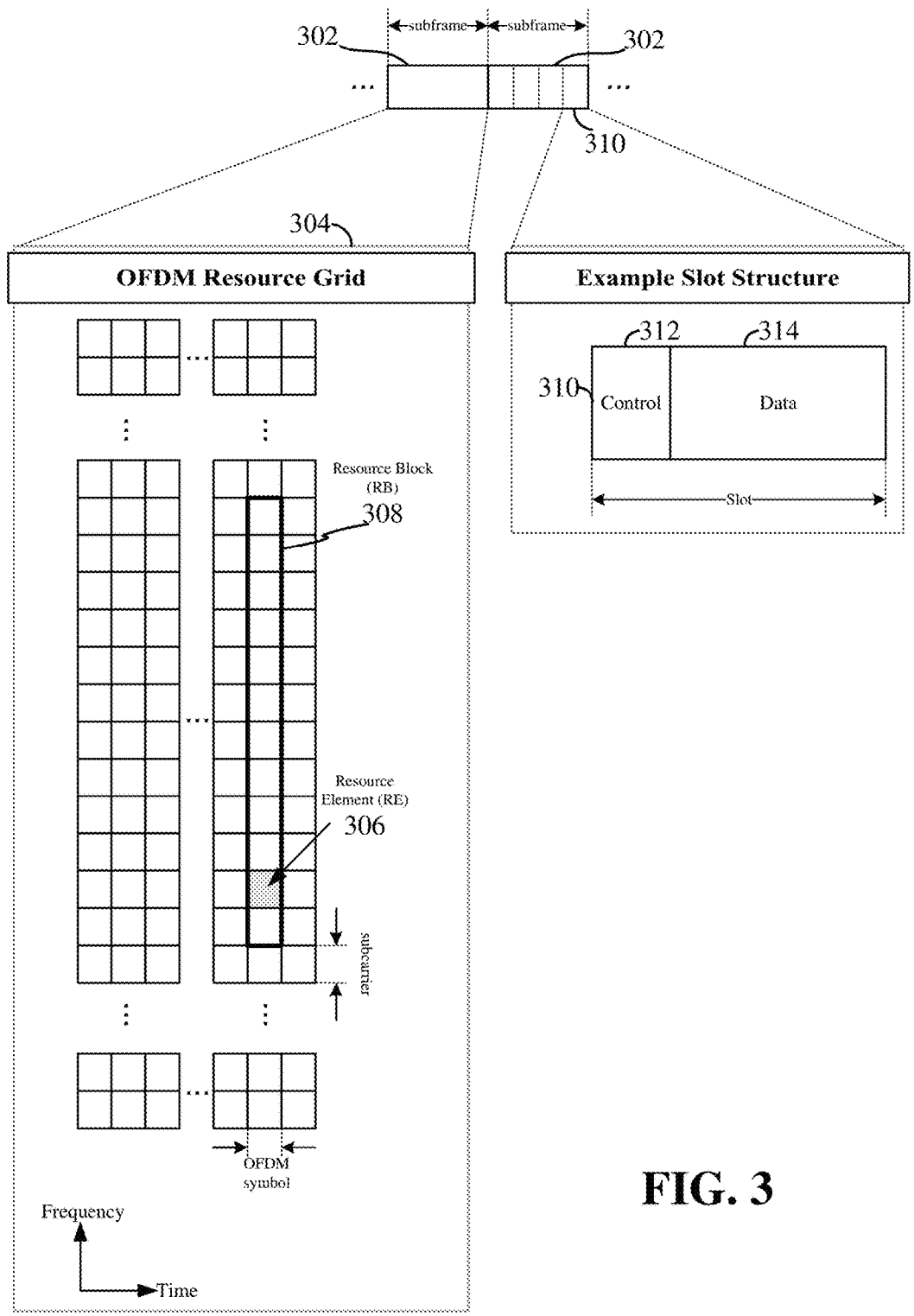
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
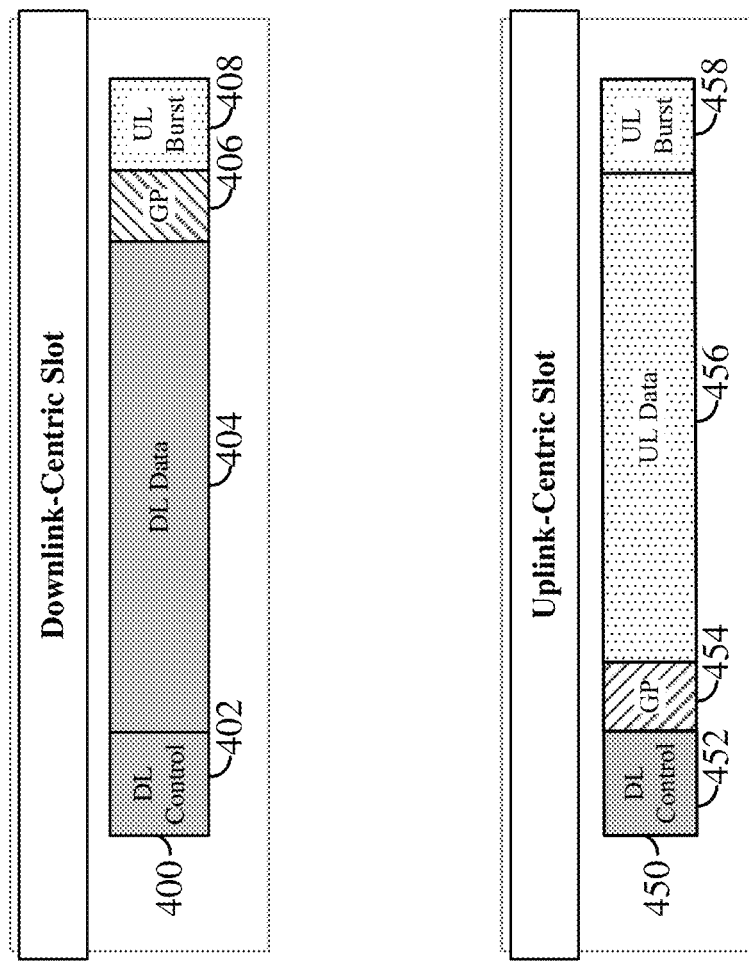
FIG. 4 is a schematic illustration of exemplary self-contained slots according to some aspects of the disclosure.

According to an aspect of the disclosure, one or more slots may be structured as self-contained slots. For example, FIG. 4 illustrates two example structures of self-contained slots 400 and 450. The self-contained slots 400 and/or 450 may be used, in some examples, in place of the slot 310 described above and illustrated in FIG. 3.

In the illustrated example, a DL-centric slot 400 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 450 may be a receiver-scheduled slot, wherein more resources are allocated for transmissions in the UL direction (e.g., transmissions from the scheduled entity 106 to the scheduling entity 108).

Each slot, such as the self-contained slots 400 and 450, may include transmit (Tx) and receive (Rx) portions. For example, in the DL-centric slot 400, the scheduling entity 202 first has an opportunity to transmit control information, e.g., on a PDCCH, in a DL control region 402, and then an opportunity to transmit DL user data or traffic, e.g., on a PDSCH in a DL data region 404. Following a guard period (GP) region 406 having a suitable duration 410, the scheduling entity 108 has an opportunity to receive UL data and/or UL feedback including any UL scheduling requests, CSF, a HARQ ACK/NACK, etc., in an UL burst 408 from other entities using the carrier. Here, a slot such as the DL-centric slot 400 may be referred to as a self-contained slot when all of the data carried in the data region 404 is scheduled in the control region 402 of the same slot; and further, when all of the data carried in the data region 404 is acknowledged (or at least has an opportunity to be acknowledged) in the UL burst 408 of the same slot. In this way, each self-contained slot may be considered a self-contained entity, not necessarily requiring any other slot to complete a scheduling-transmission-acknowledgment cycle for any given packet.

The GP region 406 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 108. Accordingly, the GP region 406 may allow an amount of time after the DL data region 404 to prevent interference, where the GP region 406 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 450 may be configured as a self-contained slot. The UL-centric slot 450 is substantially similar to the DL-centric slot 400, including a guard period 454, an UL data region 456, and an UL burst region 458.

The slot structure illustrated in slots 400 and 450 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

Generation of Selectable Encoding Sequences

As previously discussed, aspects disclosed herein include an OFDM-based single symbol design for transmitting small payloads (e.g., an acknowledgment (ACK) represented by one or two bits) via uplink (UL) short burst transmissions. When encoding such transmissions, it is contemplated that reliability may be optimized by selecting an encoding sequence from a plurality of encoding sequences in which a minimum distance between any pair of encoding sequences among the plurality of encoding sequences is maximized. An exemplary construction of such a set of selectable encoding sequences is now described.

Figure 5:
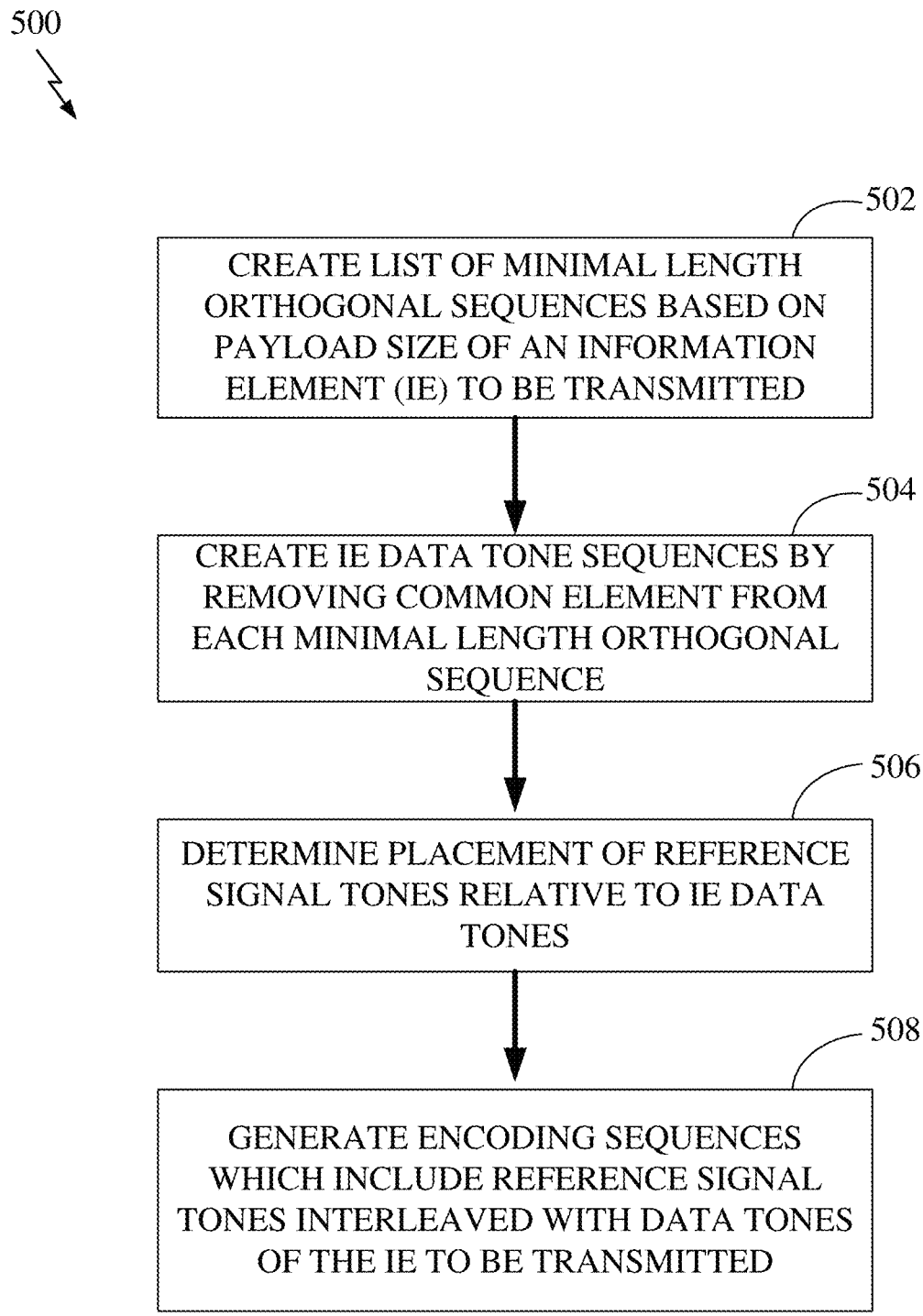
FIG. 5 is a flow chart illustrating an exemplary process for generating interleaved encoding sequences in accordance with some aspects of the present disclosure.

In an aspect of the disclosure, it is contemplated that construction of a set of selectable encoding sequences may be based on a four-step process, such as process 500 illustrated in FIG. 5. To this end, it should be appreciated that process 500 illustrates an exemplary scheduled entity process for performing some aspects of the disclosure. As described below, some or all illustrated features may be omitted in a particular implementation within the scope of the present disclosure, and some illustrated features may not be required for implementation of all embodiments. In some examples, the process 500 may be carried out by any of the scheduled entities referenced herein. In some examples, the process 500 may be carried out by any suitable apparatus or means for carrying out the functions or algorithm described below.

Process 500 begins at block 502 with the scheduled entity creating a list of minimal length orthogonal sequences based on a payload size of the information element to be transmitted. As one example, the set of encoding sequences may correspond to a Hadamard matrix. That is, the rows of a Hadamard matrix are mutually orthogonal, and accordingly, each of the selectable encoding sequences may correspond to a row of the Hadamard matrix. Those of ordinary skill in the art, however, will recognize that any suitable set of orthogonal sequences may be utilized within the scope of this disclosure, and thus not necessarily sequences based on the Hadamard matrix (e.g., based on a discrete Fourier transform (DFT) matrix). For instance, sequences corresponding to a one-bit ACK may include the orthogonal sequences listed in Table 1 below, wherein Sequence $A_1$ and Sequence $B_1$ are orthogonal to each other.

TABLE 1

| NAME | SEQUENCE | ACK VALUE |
| --- | --- | --- |
| Sequence $A_1$ | 1, 1 | ACK = 0 |
| Sequence $B_1$ | 1, −1 | ACK = 1 |

Similarly, sequences corresponding to a two-bit ACK may include the orthogonal sequences listed in Table 2 below, wherein each of Sequences $A_2$, $B_2$, $C_2$, and $D_2$ are orthogonal to each other.

TABLE 2

| NAME | SEQUENCE | ACK VALUE |
| --- | --- | --- |
| Sequence $A_2$ | 1, 1, 1, 1 | ACK = 0, 0 |
| Sequence $B_2$ | 1, −1, 1, −1 | ACK = 0, 1 |
| Sequence $C_2$ | 1, 1, −1, −1 | ACK = 1, 0 |
| Sequence $D_2$ | 1, −1, −1, 1 | ACK = 1, 1 |

At block 504, process 500 continues with the common element from each of the minimal length orthogonal sequences being removed so as to form a list of information element (IE) data tone sequences. For a one-bit ACK, as illustrated in Table 3 below, Sequence $A_1$ becomes Sequence $A_1^*$, and Sequence $B_1$ becomes Sequence $B_1^*$. Similarly, as illustrated in Table 4 with respect to a two-bit ACK, Sequence $A_2$ becomes Sequence $A_2^*$; Sequence $B_2$ becomes Sequence $B_2^*$; Sequence $C_2$ becomes Sequence $C_2^*$; and Sequence $D_2$ becomes Sequence $D_2^*$. Here, it should be noted that the common element is usually, but not always, the first element in each sequence. It should be further noted that removing the common element from each sequence does not change the distance of the sequences from each other.

TABLE 3

| NAME | SEQUENCE | ACK VALUE |
|---|---|---|
| Sequence $A_1^*$ | 1 | ACK = 0 |
| Sequence $B_1^*$ | −1 | ACK = 1 |

TABLE 4

| NAME | SEQUENCE | ACK VALUE |
|---|---|---|
| Sequence $A_2^*$ | 1, 1, 1 | ACK = 0, 0 |
| Sequence $B_2^*$ | −1, 1, −1 | ACK = 0, 1 |
| Sequence $C_2^*$ | 1, −1, −1 | ACK = 1, 0 |
| Sequence $D_2^*$ | −1, −1, 1 | ACK = 1, 1 |

In some aspects, a binary sequence may be mapped to modulated symbols. For example, every two bits of the sequence in Table 4 may be mapped to a quadrature phase-shift keying (QPSK) symbol. Repetition of the individual sequence may be applied in order to have a large enough number of bits to form the modulated symbols. As an example, the sequence A2* in Table 4 after one repetition will become 1 1 1 1 1 1. After employing this every-two-bits mapping to QPSK symbols described above, the sequence A2* will become sequence A2*', which may be represented by the sequence: $\sqrt{2}(-1-j), \sqrt{2}(-1-j), \sqrt{2}(-1-j)$. In this example, the sequences in Table 4 after this every-two-bits mapping will become mapped to the sequences as in Table 5 below.

TABLE 5

| NAME | SEQUENCE | ACK VALUE |
|---|---|---|
| Sequence $A_2^{*\prime}$ | $\sqrt{2}(-1-j), \sqrt{2}(-1-j), \sqrt{2}(-1-j)$ | ACK = 0, 0 |
| Sequence $B_2^{*\prime}$ | $\sqrt{2}(1-j), \sqrt{2}(1+j), \sqrt{2}(-1+j)$ | ACK = 0, 1 |
| Sequence $C_2^{*\prime}$ | $\sqrt{2}(-1+j), \sqrt{2}(1-j), \sqrt{2}(1+j)$ | ACK = 1, 0 |
| Sequence $D_2^{*\prime}$ | $\sqrt{2}(1+j), \sqrt{2}(-1+j), \sqrt{2}(1-j)$ | ACK = 1, 1 |

At block 506, depending on a selected reference signal ratio, a determination is then made regarding the placement of reference signal tones (e.g., demodulation reference signal (DMRS) tones) within each of the sequences generated at block 504. For instance, if a ½ reference signal ratio is selected, the placement of reference signals may be:

1 x 1 x 1 x 1 x . . .

wherein "1" corresponds to reference signal tones, and "x" corresponds to unknown values of the sequence, which will become known when the corresponding sequence is selected based on the IE to be transmitted (e.g., an ACK).

At block 508, process 500 then concludes with the generation of a plurality of encoding sequences that include reference signal tones and data tones of the IE to be transmitted (e.g., an ACK), wherein the plurality of encoding sequences are generated based on the placement determined at block 506. For instance, if a ½ reference signal ratio is selected, each "x" in the placement sequence denoted above is respectively replaced with a corresponding sequence generated at block 504. It should be noted that this sequence may be repeated within the final encoding sequence, so that the desired pattern may be repeated across the bandwidth allocated to the UE making the UL transmission. An exemplary set of encoding sequences for a one-bit ACK may thus include Sequence $A_1^{}$ and Sequence $B_1^{}$, as listed in Table 6 below, wherein the IE data tones included in each sequence are underlined.

TABLE 6

| NAME | SEQUENCE | ACK VALUE |
|---|---|---|
| Sequence $A_1^{**}$ | 1, <u>1</u>, 1, <u>1</u>, 1, <u>1</u>, 1, <u>1</u> . . . | ACK = 0 |
| Sequence $B_1^{**}$ | 1, <u>−1</u>, 1, <u>−1</u>, 1, <u>−1</u>, 1, <u>−1</u> . . . | ACK = 1 |

Similarly, for a two-bit ACK, an exemplary set of encoding sequences may include Sequence $A_2^{}$; Sequence $B_2^{}$; Sequence $C_2^{}$; and Sequence $D_2^{}$, as listed in Table 7 below, wherein the IE data tones included in each sequence are again underlined.

TABLE 7

| NAME | SEQUENCE | ACK VALUE |
|---|---|---|
| Sequence $A_2^{**}$ | 1, <u>1</u>, 1, <u>1</u>, 1, <u>1</u>, 1, <u>1</u>, 1, <u>1</u>, 1, <u>1</u> . . . | ACK = 0, 0 |
| Sequence $B_2^{**}$ | 1, <u>−1</u>, 1, <u>1</u>, 1, <u>−1</u>, 1, <u>−1</u>, 1, <u>1</u>, 1, <u>−1</u> . . . | ACK = 0, 1 |
| Sequence $C_2^{**}$ | 1, <u>1</u>, 1, <u>−1</u>, 1, <u>−1</u>, 1, <u>1</u>, 1, <u>−1</u>, 1, <u>−1</u> . . . | ACK = 1, 0 |
| Sequence $D_2^{**}$ | 1, <u>−1</u>, 1, <u>−1</u>, 1, <u>1</u>, 1, <u>−1</u>, 1, <u>−1</u>, 1, <u>1</u> . . . | ACK = 1, 1 |

Figure 6:
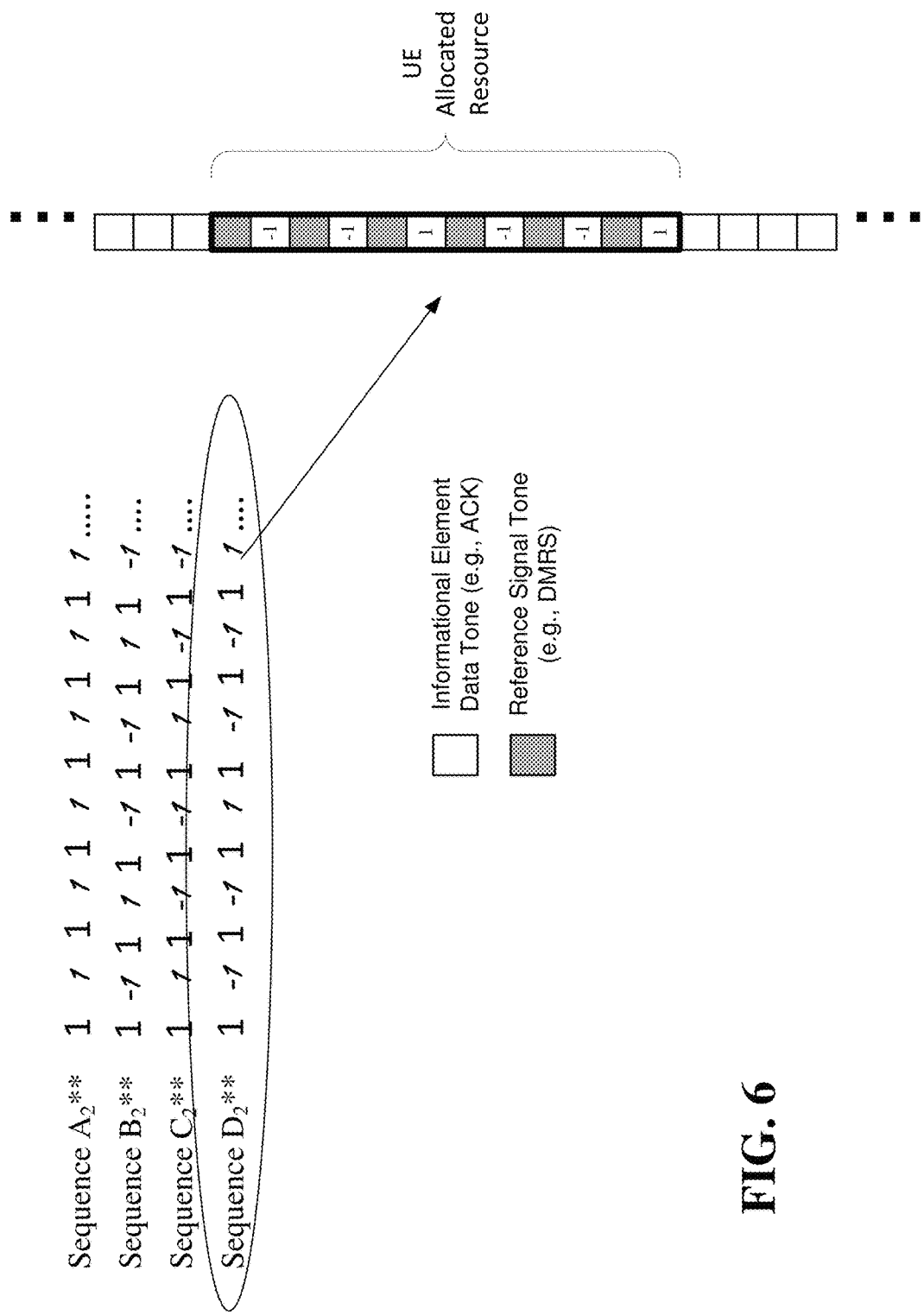
FIG. 6 illustrates an exemplary mapping of a selected encoding sequence to allocated resources for a user equipment (UE) in accordance with some aspects of the present disclosure.

Referring next to FIG. 6, an exemplary mapping of a selected encoding sequence to allocated resources for a user equipment (UE) is illustrated in accordance with some aspects of the present disclosure. For this particular example, a two-bit IE is assumed (e.g., a two-bit ACK), wherein the sequences illustrated in FIG. 6 correspond to the sequences listed in Table 7. As shown, Sequence $D_2^{**}$ has been selected, which corresponds to an ACK value of (1, 1).

In this manner, a single-symbol UL transmission may be made utilizing the above-generated sequence with a favorably low error probability. That is, because the sequence is constructed to maximize the minimum distance between the different hypotheses at the receiver (e.g., the base station or scheduling entity), an error rate in the reception can be reduced.

Figure 7:
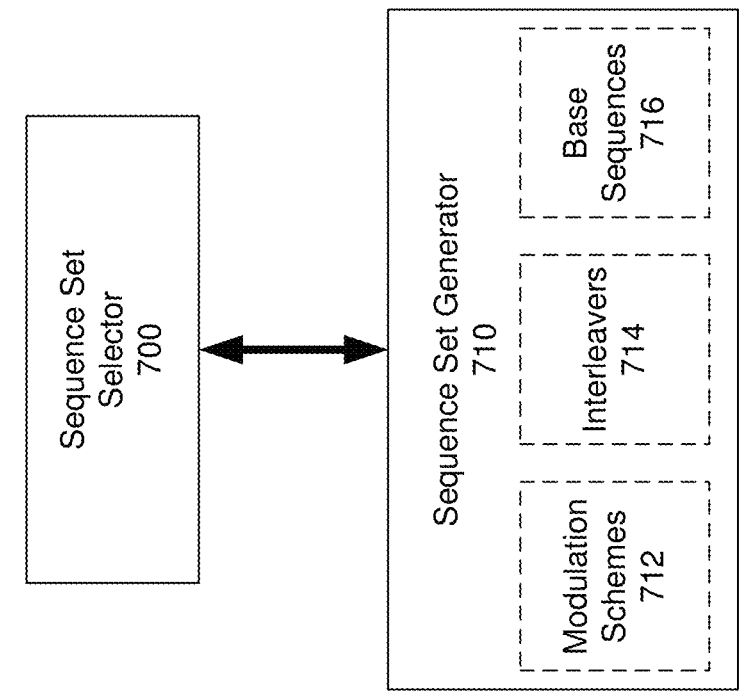
FIG. 7 illustrates an exemplary sequence set selector and sequence set generator in accordance with some aspects of the present disclosure.

In another aspect of the disclosure, it is contemplated that the selection of an encoding sequence may be further based on a peak-to-average power ratio (PAPR) associated with the encoding sequence. Namely, it is contemplated that the encoding sequences may be derived by selecting a set of encoding sequences from a plurality of sets of encoding sequences based on a PAPR of the resulting sequences included in each of the sets of encoding sequences. To facilitate deriving such sequences, a sequence set selector 700 may be coupled to a sequence set generator 710, as illustrated in FIG. 7, wherein the sequence set generator 710 may be configured to generate additional sets of encoding sequences by choosing different orthogonal sequences in block 502 noted above. Different modulation schemes 712 may also be used to construct different modulated sequences. Sequence set selector 700 may then be configured to execute a computer search to test the PAPR for the different orthogonal sequences, as well as the modulated sequences, to find the set of orthogonal sequences or modulated sequences with the best (e.g., lowest) PAPR property. An exemplary alternative set of sequences for the two-bit ACK sequences listed in Table 7, for example, is listed in Table 8 below, wherein different orthogonal sequences are selected in block 502 above. It is noted that in the set of sequences in Table 8, the data tones may not only take the values of +1 and −1; but also, may take the values of +j and −j. In this instance, a quadrature modulation may be utilized to represent the complex numbers in the orthogonal sequences, e.g., QPSK.

TABLE 8

| NAME | SEQUENCE | ACK VALUE |
|---|---|---|
| Sequence $A_2$*** | 1, 1, 1, 1, 1, 1, 1, 1, 1, 1, 1, 1 . . . | ACK = 0, 0 |
| Sequence $B_2$*** | 1, −1, 1, 1, 1, −1, 1, −1, 1, 1, 1, −1 . . . | ACK = 0, 1 |
| Sequence $C_2$*** | 1, j, 1, −1, 1, −j, 1, j, 1, −1, 1, −j . . . | ACK = 1, 0 |
| Sequence $D_2$*** | 1, −j, 1, −1, 1, j, 1, −j, 1, −1, 1, j . . . | ACK = 1, 1 |

In another aspect of the disclosure, it is contemplated that the sequence set generator 710 may be configured to generate encoding sequences based on application of a predetermined interleaver to the selected encoding sequence, wherein the predetermined interleaver is selected from among a plurality of interleavers 714 based on a PAPR of the resulting sequences associated with each of the interleavers. For instance, different reference signal offsets may be used (e.g., even or odd tones for ½ DMRS ratio), and further, an interleaver may be applied to the IE data tones in the "x" positions for each candidate reference signal offset. Here, the interleaver pattern may rearrange the positions of the data tones within the various sequences, causing changes to the PAPR of the sequences based on the resulting final, rearranged sequence. Sequence set selector 700 may then be configured to execute a computer search to test the various rearranged sequences and find the best reference signal offset and best interleaver that yields the sequences with the best (e.g., lowest) PAPR.

In yet another aspect of the disclosure, it is contemplated that the sequence set generator 710 may be configured to generate additional encoding sequences by multiplying each encoded sequence by a predetermined base sequence (e.g., a Chu sequence, CGS sequence, etc.), wherein the predetermined base sequence is selected from among a plurality of base sequences 716 based on a PAPR of the resulting sequences associated with each of the base sequences. Sequence set selector 700 may then be configured to execute a computer search to find the base sequence that yields the best PAPR results.

Exemplary Scheduling Entity

Figure 8:
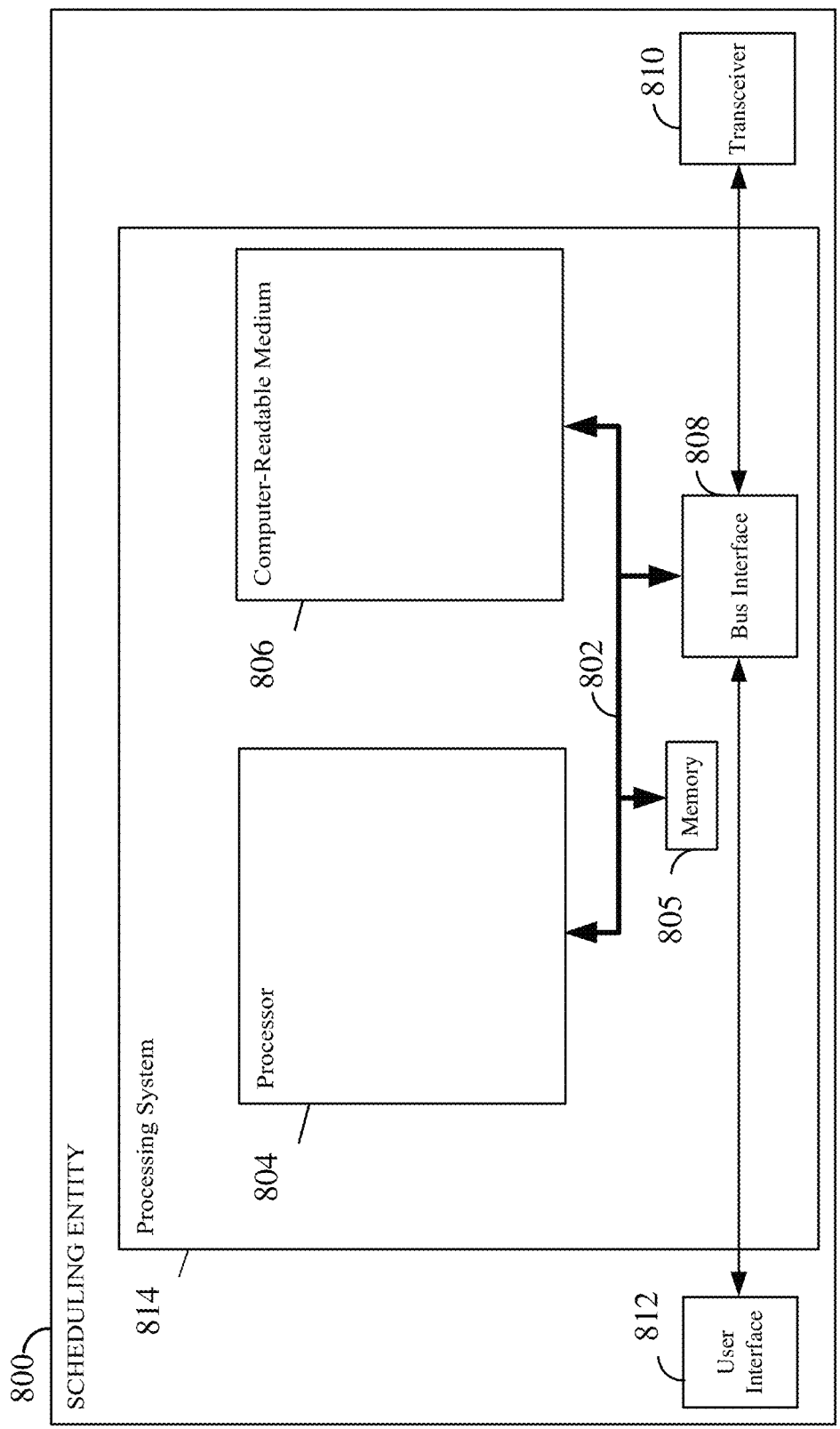
FIG. 8 is a block diagram illustrating an example of a hardware implementation for a scheduling entity apparatus employing a processing system.

FIG. 8 is a block diagram illustrating an example of a hardware implementation for a scheduling entity 800 employing a processing system 814. For example, the scheduling entity 800 may be a user equipment (UE) as illustrated in any one or more of FIGS. included herein. In another example, the scheduling entity 800 may be a base station as illustrated in any one or more of FIGS. included herein.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures disclosed herein.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

In some aspects of the disclosure, the processor 804 may include circuitry configured for various functions, including, for example, receiving a symbol transmitted by a scheduled entity (e.g., scheduled entity 900), wherein the symbol comprises a plurality of frequency division multiplexed (FDM) resource elements configured according to an encoded sequence selected by the scheduled entity from a plurality of encoding sequences. Here, it should be appreciated that the plurality of encoding sequences from which the encoded sequence is selected may be any of the contemplated sets of encoding sequences disclosed herein (e.g., the encoding sequences listed in Tables 6-8). It is thus further contemplated that the processor 804 may also include circuitry configured to decode the received symbols to ascertain the IE encoded in the symbol.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include software configured for various functions, including, for example, receiving a symbol transmitted by a scheduled entity (e.g., scheduled entity 900), wherein the symbol comprises a plurality of FDM resource elements configured according to an encoded sequence selected by the scheduled entity from a plurality of encoding sequences. Here, it should be appreciated that the plurality of encoding sequences from which the encoded sequence is selected may be any of the contemplated sets of encoding sequences disclosed herein (e.g., the encoding sequences listed in Tables 6-8). It is thus further contemplated that the computer-readable storage medium 806 may be configured to decode the received symbols to ascertain the IE encoded in the symbol.

Exemplary Scheduled Entity

Figure 9:
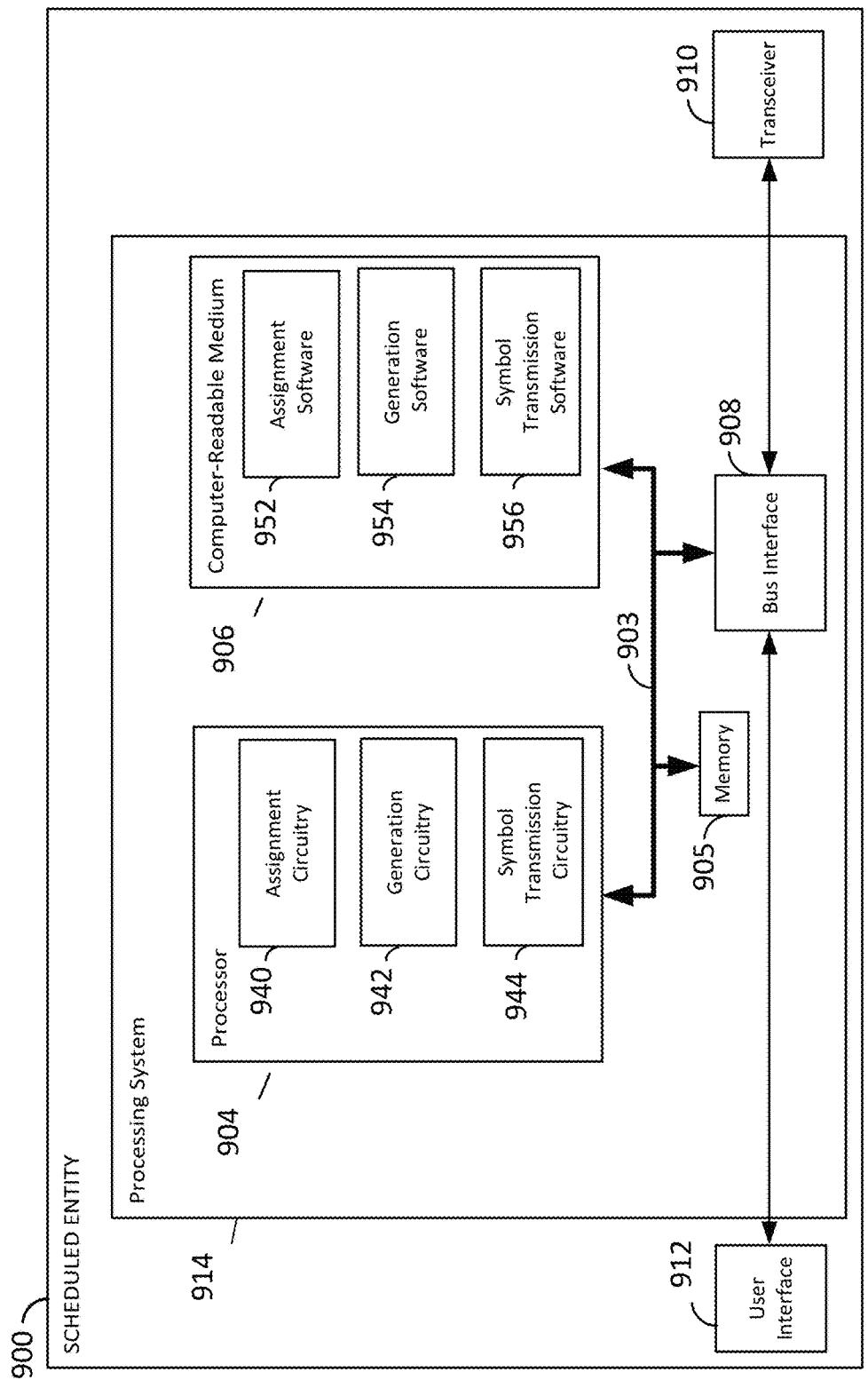
FIG. 9 is a block diagram illustrating an example of a hardware implementation for a scheduled entity apparatus employing a processing system.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of the FIGs. disclosed herein.

The processing system 914 may be substantially the same as the processing system 814 illustrated in FIG. 8, including a bus interface 908, a bus 902, memory 905, a processor 904, and a computer-readable medium 906. Furthermore, the scheduled entity 900 may include a user interface 912 and a transceiver 910 substantially similar to those described above in FIG. 8. That is, the processor 904, as utilized in a scheduled entity 900, may be used to implement any one or more of the processes described below and illustrated in the various figures.

In some aspects of the disclosure, the processor 904 may include an assignment circuitry 940 configured for various functions, including, for example, to assign a different encoding sequence to each possible value of an information element (IE) such that a minimum distance between encoding sequences corresponding to any pair of possible values is maximized. In an exemplary implementation, the IE corresponds to an acknowledgment (ACK) having a payload size of one or two bits. As illustrated, the processor 904 may also include generation circuitry 942 configured for various functions. For instance, generation circuitry 942 may be configured to generate a set of interleaved sequences in which a sequence corresponding to a reference signal is interleaved into each of the different encoding sequences. The processor 904 may further include symbol transmission circuitry 944 configured for various functions, including, for example, to transmit a symbol (e.g., within an uplink short burst) corresponding to a particular value of the IE, wherein the symbol is configured according to an interleaved sequence selected from the set of interleaved sequences corresponding to the particular value of the IE, and wherein the symbol comprises a plurality of reference signals interleaved with, and frequency division multiplexed (FDM) with, a plurality of FDM resource elements. To this end, it should be appreciated that, the combination of the assignment circuitry 940, the generation circuitry 942, and the symbol transmission circuitry 944 may be configured to implement one or more of the functions described herein.

Various other aspects for scheduled entity 900 are also contemplated. For instance, it is contemplated that the assignment circuitry 940 may be configured to select the encoding sequences from rows of a matrix that are mutually orthogonal from each other (e.g., a Hadamard matrix or a discrete Fourier transform (DFT) matrix). In another aspect of the disclosure, the generation circuitry 942 may be configured to index the set of interleaved sequences according to a corresponding ratio associated with the plurality of reference signals (e.g., a ½ reference signal ratio).

In another aspect of the disclosure, it is contemplated that the symbol transmission circuitry 944 may be configured to select the interleaved sequence based on a peak-to-average power ratio (PAPR) associated with the interleaved sequence. In a particular example, the assignment circuitry 940 may be configured to assign at least a second set of different encoding sequences to each possible value of the IE, wherein the generation circuitry 942 is configured to generate a second set of interleaved sequences corresponding to the second set of different encoding sequences. For instance, the generation circuitry 942 may be further configured to generate at least one set of modulated sequences. (See e.g., Table 5). The symbol transmission circuitry 944 may then be configured to select the interleaved sequence having the most desirable PAPR to encode the IE from among the first or second sets of interleaved sequences.

Additional sequences having different PAPR values may also be derived by utilizing different interleavers. Namely, it is contemplated that the generation circuitry 942 may be configured to generate the set of interleaved sequences based on application of a predetermined interleaver, wherein the predetermined interleaver is selected from a plurality of interleavers based on a PAPR associated with the application of the predetermined interleaver. For instance, the generation circuitry 942 may be configured to select a reference signal offset to facilitate locating interleaved reference signals among the plurality of FDM resource elements, wherein the reference signal offset is selected from a plurality of reference signal offsets based on a PAPR associated with the reference signal offset.

It is also contemplated that additional sequences having different PAPR values may be derived by utilizing different base sequence multipliers. Namely, it is contemplated that the generation circuitry 942 may be configured to multiply the set of interleaved sequences with a predetermined base sequence, wherein the predetermined base sequence is selected from a plurality of base sequences based on a PAPR associated with the predetermined base sequence (e.g., a Chu sequence or a computer-generated sequence (CGS)).

Referring back to the remaining components of scheduled entity 900, similar to processor 804, processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. Similar to computer-readable medium 806, computer-readable medium 906 may be a non-transitory computer-readable medium comprising characteristics that are substantially similar. The computer-readable medium 906 may reside in the processing system 914, external to the processing system 914, or distributed across multiple entities including the processing system 914. It should also be appreciated that, similar to computer-readable medium 806, computer-readable medium 906 may be embodied in a computer program product comprising characteristics that are substantially similar.

In one or more examples, the computer-readable storage medium 906 may include assignment software 952 configured for various functions, including, for example, to assign a different encoding sequence to each possible value of an IE such that a minimum distance between encoding sequences corresponding to any pair of possible values is maximized. In an exemplary implementation, the IE corresponds to an ACK having a payload size of one or two bits. As illustrated, the computer-readable medium 906 may also include generation software 954 configured for various functions. For instance, generation software 954 may be configured to generate a set of interleaved sequences in which a sequence corresponding to a reference signal is interleaved into each of the different encoding sequences. The computer-readable medium 906 may further include symbol transmission software 956 configured for various functions, including, for example, to transmit a symbol (e.g., within an uplink short burst) corresponding to a particular value of the IE, wherein the symbol is configured according to an interleaved sequence selected from the set of interleaved sequences corresponding to the particular value of the IE, and wherein the symbol comprises a plurality of reference signals interleaved with, and frequency division multiplexed (FDM) with, a plurality of FDM resource elements. To this end, it should be appreciated that, the combination of the assignment software 952, the generation software 954, and the symbol transmission software 956 may be configured to implement one or more of the functions described herein.

In a particular configuration, it is also contemplated that the scheduled entity 900 includes means for assigning a different encoding sequence to each possible value of an IE; means for generating a set of interleaved sequences; and means for transmitting a symbol corresponding to a particular value of the IE configured according to an interleaved sequence selected from the set of interleaved sequences. In one aspect, the aforementioned means may be the processor(s) 904 configured to perform the functions recited by the aforementioned means. In another aspect, the aforementioned means may be a circuit or any apparatus configured to perform the functions recited by the aforementioned means.

Figure 10:
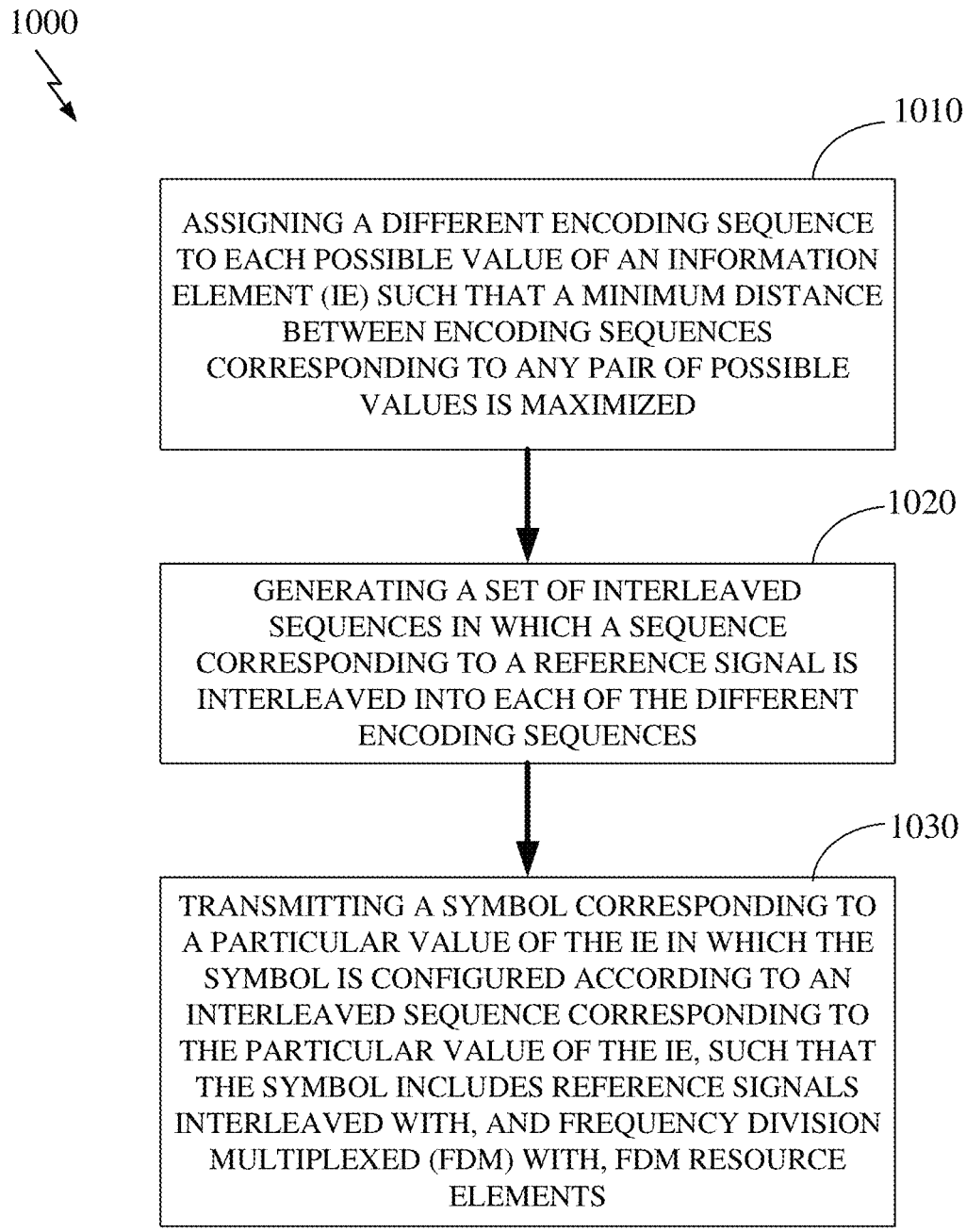
FIG. 10 is a flow chart illustrating an exemplary process for transmitting small payloads via a single symbol design in accordance with some aspects of the present disclosure.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described herein, and utilizing, for example, the processes and/or algorithms described in relation to FIG. 10.

In FIG. 10, a flow chart is provided, which illustrates an exemplary scheduled entity process for performing some aspects of the disclosure. As described below, some or all illustrated features may be omitted in a particular implementation within the scope of the present disclosure, and some illustrated features may not be required for implementation of all embodiments. In some examples, the process 1000 may be carried out by the scheduled entity 900 illustrated in FIG. 9. In some examples, the process 1000 may be carried out by any suitable apparatus or means for carrying out the functions or algorithm described below.

Process 1000 begins at block 1010 with the assignment circuitry 940 and/or assignment software 952 assigning a different encoding sequence to each possible value of an IE such that a minimum distance (i.e., minimum difference) between encoding sequences corresponding to any pair of possible values is maximized. In an exemplary implementation, the IE corresponds to an ACK having a payload size of one or two bits. After the assigning performed at block 1010, process 1000 proceeds to block 1020 where the generation circuitry 942 and/or generation software 954 generates a set of interleaved sequences in which a sequence corresponding to a reference signal is interleaved into each of the different encoding sequences. Process 1000 then concludes at block 1030 where the symbol transmission circuitry 944 and/or symbol transmission software 956 transmits a symbol corresponding to a particular value of the IE, wherein the symbol is configured according to an interleaved sequence selected from the set of interleaved sequences corresponding to the particular value of the IE, and wherein the symbol comprises a plurality of reference signals interleaved with, and FDM with, a plurality of FDM resource elements.

Various other aspects for process 1000 are also contemplated. For instance, it is contemplated that the assigning performed at block 1010 may comprise selecting the encoding sequences from rows of a matrix that are mutually orthogonal from each other (e.g., a Hadamard matrix or a discrete Fourier transform (DFT) matrix). In another aspect of the disclosure, the generating performed at block 1020 may comprise indexing the set of interleaved sequences according to a corresponding ratio associated with the plurality of reference signals (e.g., a ½ reference signal ratio).

In another aspect of the disclosure, it is contemplated that the transmitting performed at block 1030 may comprise selecting the interleaved sequence based on a PAPR associated with the interleaved sequence. In a particular example, the assigning performed at block 1010 may comprise assigning at least a second set of different encoding sequences to each possible value of the IE, wherein the generating performed at block 1020 comprises generating a second set of interleaved sequences corresponding to the second set of different encoding sequences. For instance, the generating performed at block 1020 may comprise generating at least one set of modulated sequences. (See e.g., Table 5). The transmitting performed at block 1030 may then comprise selecting the interleaved sequence having the most desirable PAPR to encode the IE from among the first or second sets of interleaved sequences.

As previously stated, additional sequences having different PAPR values may also be derived by utilizing different interleavers. Namely, it is contemplated that the generating performed at block 1020 may comprise generating the set of interleaved sequences based on application of a predetermined interleaver, wherein the predetermined interleaver is selected from a plurality of interleavers based on a PAPR associated with the application of the predetermined interleaver. For instance, the generating performed at block 1020 may comprise selecting a reference signal offset to facilitate locating interleaved reference signals among the plurality of FDM resource elements, wherein the reference signal offset is selected from a plurality of reference signal offsets based on a PAPR associated with the reference signal offset.

It is also contemplated that additional sequences having different PAPR values may be derived by utilizing different base sequence multipliers. Namely, it is contemplated that the generating performed at block 1020 may comprise multiplying the set of interleaved sequences with a predetermined base sequence, wherein the predetermined base sequence is selected from a plurality of base sequences based on a PAPR associated with the predetermined base sequence (e.g., a Chu sequence or a CGS).

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Other aspects, features, and embodiments of the present invention will become apparent to those of ordinary skill in the art, upon reviewing the above description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may have been discussed as device, system, or method embodiments it should be understood that such exemplary embodiments can be implemented in various devices, systems, and methods.

What is claimed is:

1. A method of wireless communication operable at a scheduled entity, the method comprising:
   assigning a different encoding sequence to each of n different values of an information element (IE), where n is an integer greater than 1, wherein a minimum distance between encoding sequences corresponding to any pair of the n different values is maximized; and
   transmitting a symbol corresponding to a particular value of the IE, wherein the symbol is configured according to a sequence selected from a set of sequences corresponding to the particular value of the IE, the symbol comprising a plurality of reference signals frequency division multiplexed (FDM) with a plurality of FDM resource elements.

2. The method of claim 1, wherein the assigning comprises selecting the encoding sequences from rows of a matrix that are mutually orthogonal from each other.

3. The method of claim 2, wherein the matrix is one of a Hadamard matrix or a discrete Fourier transform (DFT) matrix.

4. The method of claim 1, wherein the IE corresponds to an acknowledgment (ACK), and wherein the IE has a payload size of one or two bits.

5. The method of claim 1, wherein the set of sequences is a set of interleaved sequences, and further comprising generating the set of interleaved sequences, the set of interleaved sequences including a sequence corresponding to a reference signal interleaved into each of the different encoding sequences.

6. The method of claim 5, wherein the generating further comprises indexing the set of interleaved sequences according to a corresponding ratio associated with the plurality of reference signals.

7. The method of claim 1, wherein the transmitting comprises transmitting the symbol within an uplink short burst.

8. The method of claim 1, wherein the transmitting comprises selecting the sequence based on a peak-to-average power ratio (PAPR) associated with the sequence.

9. The method of claim 8, wherein the assigning comprises assigning at least a second set of different encoding sequences to each of the n different values of an information element (IE), and wherein the set of sequences is a set of interleaved sequences, and further comprising:
   generating the set of interleaved sequences, the set of interleaved sequences including a sequence corresponding to a reference signal interleaved into each of the different encoding sequences; and
   generating a second set of interleaved sequences corresponding to the second set of different encoding sequences.

10. The method of claim 9, further comprising generating at least one set of modulated sequences.

11. The method of claim 8, wherein the set of sequences is a set of interleaved sequences, and further comprising generating the set of interleaved sequences, the set of interleaved sequences including a sequence corresponding to a reference signal interleaved into each of the different encoding sequences, wherein the generating is based on application of a predetermined interleaver, and wherein the predetermined interleaver is selected from a plurality of interleavers based on a PAPR associated with the application of the predetermined interleaver.

12. The method of claim 11, further comprising selecting a reference signal offset to facilitate locating interleaved reference signals among the plurality of FDM resource elements, and wherein the reference signal offset is selected from a plurality of reference signal offsets based on a PAPR associated with the reference signal offset.

13. The method of claim 8, wherein the set of sequences is a set of interleaved sequences, and further comprising generating the set of interleaved sequences, the set of interleaved sequences including a sequence corresponding to a reference signal interleaved into each of the different encoding sequences, wherein the generating comprises multiplying the set of interleaved sequences with a predetermined base sequence, and wherein the predetermined base sequence is selected from a plurality of base sequences based on a PAPR associated with the predetermined base sequence.

14. The method of claim 13, wherein the predetermined base sequence is a Chu sequence or a computer-generated sequence (CGS).

15. A wireless communication device comprising:
   a processor;
   a memory communicatively coupled to the processor;
   a transceiver communicatively coupled to the processor;
   an assignment circuitry communicatively coupled to the processor, wherein the assignment circuitry is configured to assign a different encoding sequence to each of n different values of an information element (IE), where n is an integer greater than 1, wherein a minimum distance between encoding sequences corresponding to any pair of the n different values is maximized; and
   a symbol transmission circuitry communicatively coupled to the processor, wherein the symbol transmission circuitry is configured to transmit a symbol corresponding to a particular value of the IE, and wherein the symbol is configured according to a sequence selected from a set of sequences corresponding to the particular value of the IE, the symbol comprising a plurality of reference signals frequency division multiplexed (FDM) with a plurality of FDM resource elements.

16. The wireless communication device of claim 15, wherein the assignment circuitry is configured to select the encoding sequences from rows of a matrix that are mutually orthogonal from each other.

17. The wireless communication device of claim 16, wherein the matrix is one of a Hadamard matrix or a discrete Fourier transform (DFT) matrix.

18. The wireless communication device of claim 15, wherein the IE corresponds to an acknowledgment (ACK), and wherein the IE has a payload size of one or two bits.

19. The wireless communication device of claim 15, wherein the set of sequences is a set of interleaved sequences, and further comprising a generation circuitry communicatively coupled to the processor, wherein the generation circuitry is configured to generate the set of interleaved sequences, the set of interleaved sequences including a sequence corresponding to a reference signal interleaved into each of the different encoding sequences.

20. The wireless communication device of claim 19, wherein the generation circuitry is configured to index the set of interleaved sequences according to a corresponding ratio associated with the plurality of reference signals.

21. The wireless communication device of claim 15, wherein the symbol transmission circuitry is configured to transmit the symbol within an uplink short burst.

22. The wireless communication device of claim 15, wherein the symbol transmission circuitry is configured to select the sequence based on a peak-to-average power ratio (PAPR) associated with the sequence.

23. The wireless communication device of claim 22, wherein the assignment circuitry is configured to assign at least a second set of different encoding sequences to each of the n different values of an information element (IE), and wherein the set of sequences is a set of interleaved sequences, and further comprising a generation circuitry communicatively coupled to the processor, wherein the generation circuitry is configured to:
  generate the set of interleaved sequences, the set of interleaved sequences including a sequence corresponding to a reference signal interleaved into each of the different encoding sequences, and
  generate a second set of interleaved sequences corresponding to the second set of different encoding sequences.

24. The wireless communication device of claim 23, wherein the generation circuitry is further configured to generate at least one set of modulated sequences.

25. The wireless communication device of claim 22, wherein the set of sequences is a set of interleaved sequences, and further comprising a generation circuitry communicatively coupled to the processor, wherein the generation circuitry is configured to generate the set of interleaved sequences, the set of interleaved sequences including a sequence corresponding to a reference signal interleaved into each of the different encoding sequences, wherein the generation circuitry is configured to generate the set of interleaved sequences based on application of a predetermined interleaver, and wherein the predetermined interleaver is selected from a plurality of interleavers based on a PAPR associated with the application of the predetermined interleaver.

26. The wireless communication device of claim 25, wherein the generation circuitry is configured to select a reference signal offset to facilitate locating interleaved reference signals among the plurality of FDM resource elements, and wherein the reference signal offset is selected from a plurality of reference signal offsets based on a PAPR associated with the reference signal offset.

27. The wireless communication device of claim 22, wherein the set of sequences is a set of interleaved sequences, and further comprising a generation circuitry communicatively coupled to the processor, wherein the generation circuitry is configured to generate the set of interleaved sequences, the set of interleaved sequences including a sequence corresponding to a reference signal interleaved into each of the different encoding sequences, wherein the generation circuitry is configured to multiply the set of interleaved sequences with a predetermined base sequence, and wherein the predetermined base sequence is selected from a plurality of base sequences based on a PAPR associated with the predetermined base sequence.

28. The wireless communication device of claim 27, wherein the predetermined base sequence is a Chu sequence or a computer-generated sequence (CGS).

29. A non-transitory computer-readable medium storing computer-executable code, comprising code for causing a computer to:
  assign a different encoding sequence to each of n different values of an information element (IE), where n is an integer greater than 1, wherein a minimum distance between encoding sequences corresponding to any pair of the n different values is maximized; and
  transmit a symbol corresponding to a particular value of the IE, wherein the symbol is configured according to a sequence selected from a set of sequences corresponding to the particular value of the IE, the symbol comprising a plurality of reference signals frequency division multiplexed (FDM) with a plurality of FDM resource elements.

30. A wireless communication device comprising:
  means for assigning a different encoding sequence to each of n different values of an information element (IE), where n is an integer greater than 1, wherein a minimum distance between encoding sequences corresponding to any pair of the n different values is maximized; and
  means for transmitting a symbol corresponding to a particular value of the IE, wherein the symbol is configured according to a sequence selected from a set of sequences corresponding to the particular value of the IE, the symbol comprising a plurality of reference signals frequency division multiplexed (FDM) with a plurality of FDM resource elements.

* * * * *